(12) United States Patent
Henderson

(10) Patent No.: US 8,287,038 B2
(45) Date of Patent: Oct. 16, 2012

(54) EXTENDABLE STROLLER SHADE

(76) Inventor: Heather Henderson, Vancouver, WA (US)

( * ) Notice: Subject to any disclaimer, the term of this patent is extended or adjusted under 35 U.S.C. 154(b) by 0 days.

(21) Appl. No.: 13/084,425

(22) Filed: Apr. 11, 2011

(65) Prior Publication Data

US 2011/0248533 A1 Oct. 13, 2011

Related U.S. Application Data

(60) Provisional application No. 61/322,794, filed on Apr. 9, 2010.

(51) Int. Cl.
*A47C 29/00* (2006.01)

(52) U.S. Cl. ......... 297/184.17; 297/184.11; 297/184.13; 297/184.15; 296/77.1; 296/107.2; 280/647; 280/47.38

(58) Field of Classification Search .. 297/184.1–184.17; 296/77.1, 97.21, 107.02; 280/647, 47.38, 280/650

See application file for complete search history.

(56) References Cited

U.S. PATENT DOCUMENTS

| | | | | | |
|---|---|---|---|---|---|
| 1,092,225 | A | * | 4/1914 | Ragsdale | 296/83 |
| 1,143,774 | A | * | 6/1915 | Nicholls | 135/88.02 |
| 1,289,965 | A | * | 12/1918 | Tichenor | 296/107.02 |
| 1,470,630 | A | * | 10/1923 | Mahr | 296/107.02 |
| 3,193,322 | A | * | 7/1965 | Hines | 296/102 |
| 4,810,030 | A | * | 3/1989 | Lewis | 297/184.17 |
| 4,978,166 | A | * | 12/1990 | James | 297/184.17 |
| 5,184,865 | A | * | 2/1993 | Mohtasham et al. | 296/77.1 |
| 5,320,405 | A | * | 6/1994 | Foster et al. | 297/184.17 |
| 5,988,669 | A | * | 11/1999 | Freese et al. | 280/642 |
| 6,019,421 | A | * | 2/2000 | Roh | 297/184.13 |
| 6,068,322 | A | * | 5/2000 | Kuester | 296/97.21 |
| 6,139,046 | A | * | 10/2000 | Aalund et al. | 280/642 |
| 6,402,225 | B1 | * | 6/2002 | Hsia | 296/107.02 |
| 7,000,625 | B2 | * | 2/2006 | Dickson et al. | 135/88.02 |
| 7,118,173 | B2 | * | 10/2006 | Kassai et al. | 297/184.13 |
| 7,891,732 | B2 | * | 2/2011 | Hei et al. | 297/184.13 |
| 7,963,596 | B2 | * | 6/2011 | Efthimiou | 297/184.11 |

* cited by examiner

*Primary Examiner* — Laurie Cranmer
(74) *Attorney, Agent, or Firm* — FSP LLC

(57) ABSTRACT

A stroller or carseat shade is formed from a fabric having a middle section tapered on two sides. Rod tunnels run from a first taper across the middle section to a second taper. An elastic section is formed to wrap around and cling to an existing canopy on a stroller or car seat. The shade is symmetrical relative to a front to back axis. Fasteners are positioned at a series of overlapping stop positions parallel to the front to back axis.

8 Claims, 29 Drawing Sheets

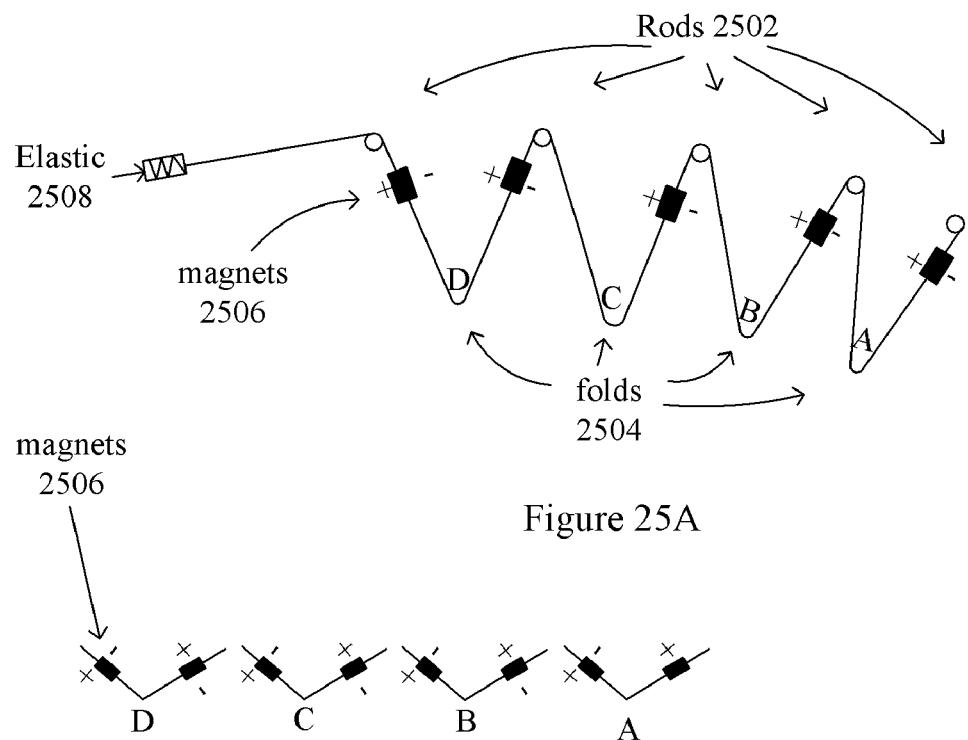
Figure 25A
Figure 25B
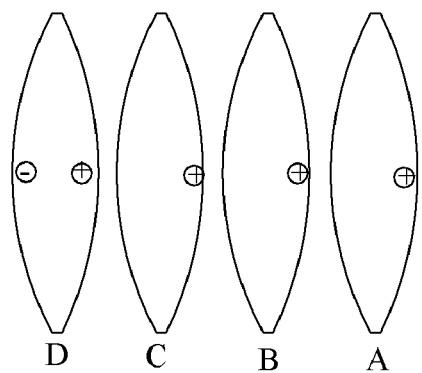
Figure 25C

EXTENDABLE STROLLER SHADE

PRIORITY

This application claims priority under 35 U.S.C. 119 to USA provisional application No. 61/322,794 filed on Apr. 9, 2010 which is incorporated herein by reference in its entirety.

BACKGROUND

When children sit or sleep in strollers or car seats the existing canopies often do not provide full and adjustable protection from the sun. Existing canopies often do not facilitate sleep due to their open nature and lack of privacy. They often do not cover the child and protect them from strangers touching them. Many aftermarket shades require removal after use, which is cumbersome. Parents often cover strollers/car seats in a blanket to protect their children. The blankets often blow off or can make the child uncomfortably hot. Adjusting the blanket is inconvenient.

The "Ray Shade" sold by Kiddopotomus is a large piece of fabric that lays completely over the existing stroller shade and ties to several places on the stroller frame. The fabric extends off the existing canopy about 12" and is supported by tubing. Because the fabric that extends off the existing shade is virtually unsupported except for at the brim where the tubing is, the shade sinks into the child's line of sight leading to the child batting at it to get it out of their face. It provides mid-late afternoon sun protection, but doesn't cover the child from the elements or provide a private nap space. Furthermore, it must be removed prior to folding up the stroller and reattached each time before use.

Other sunshade designs, for example for child car seats as described in US Patent Publication 2007/0257526, are somewhat extendable but only provide a limited number of configuration positions.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIGS. 25A-25C illustrate magnet configurations for an extendable shade.

DETAILED DESCRIPTION

Figure 1:
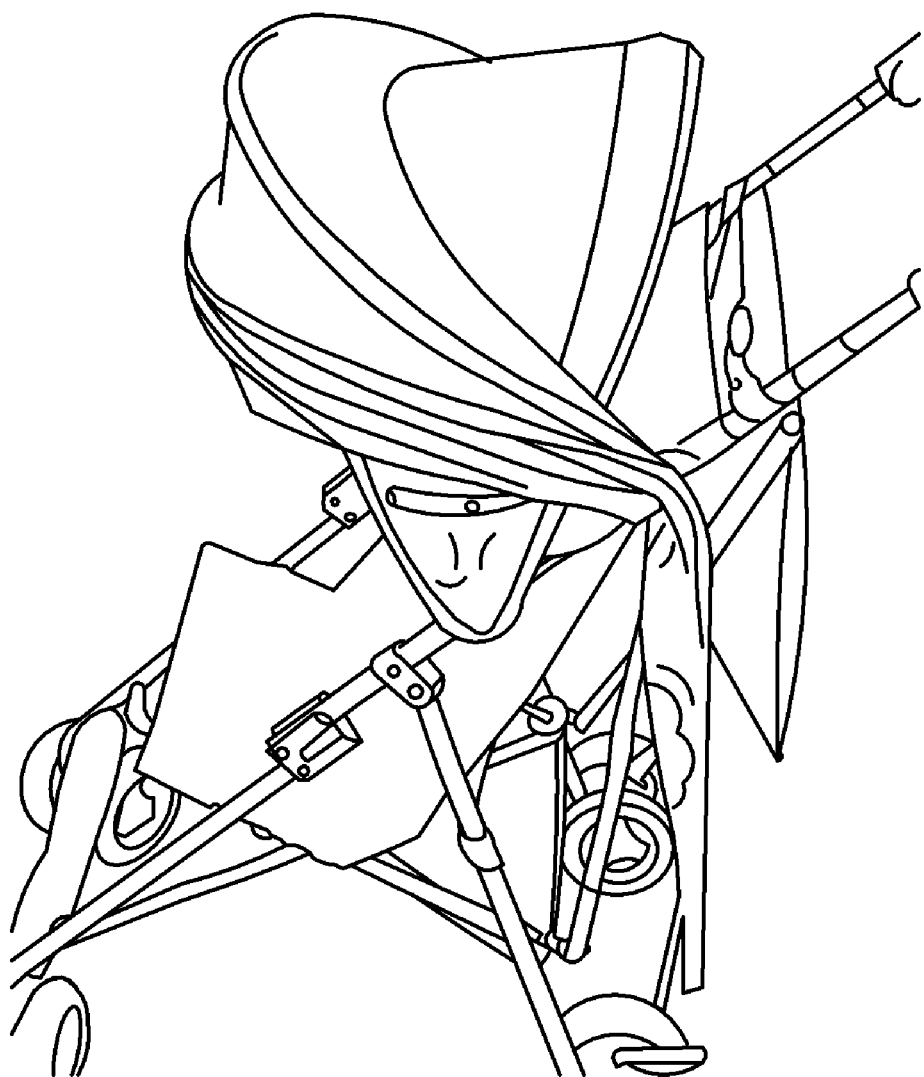
FIG. 1 illustrates the act of installing a shade on a stroller canopy.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

Overview

A novel shading apparatus is herein disclosed that attaches to a stroller or car seat, that does not need to be removed even during storage of the stroller or car seat. The shade may also be attached to bouncers. The shade acts as an extension of an existing device canopy. In one embodiment the shade has four settings depending on the angle of the sun or the level of privacy desired.

The shade is an adjustable device that provides the child with customizable sun and inclement weather protection as well as privacy and protection from other people.

The shade protects a child from sun, cold weather, germs, prying eyes, and fosters uninterrupted sleep. The stroller shade has two ties to attach to the stroller, and does not need to be removed when the stroller is stored. It folds up with the stroller and can be extended with one hand instantly. Additionally, an older child can extend and retract it as they need it. It can be removed and washed. It comes in designer prints and is reversible, offering two styles. The shade is adjustable via magnets sewn into each panel of the shade. Other sun shades lay over the entire stroller canopy covering the "viewing window" found on most strollers. The stroller shade described here only covers a few inches of the existing canopy leaving the parent able to view their child through the window.

Description

A stroller shade comprises one or two layers of fabric. It comprises preferably five panels, but could have as little as one or as many as ten. The shade may be between 25-45 inches wide (from side to side) but is preferably between 35-43 inches. The shade is retractable using rare earth magnets, but may use regular magnets or other mechanisms to close or connect, such as snaps, Velcro, zipper, etc. In between each panel is a supporting rod which may be a tube, spring, plastic rod, spring steel, but is preferably a fiberglass rod. The supporting device may be any diameter, preferably under ½ inch, but not necessarily. The shade attaches to a stroller via a set of ties on each side of the shade. However, the shade could attach using other attaching devices like hooks, Velcro, snaps, bungee cords, etc. The panel that lays over the existing stroller canopy is held snugly to the existing canopy by having the outermost panel edge elasticized. Elastic is the preferred method, but isn't required. The shade may also be affixed using clips, magnets, clamps or anything that would hold it onto the existing canopy. Additionally the shade may be employed on bassinets and prams to facilitate sleep and block light sources.

FIG. 1 illustrates the act of installing a shade on a stroller canopy. The shade is pulled on to the stroller canopy such that an internal support rod presses up against the front of the canopy.

Figure 2:
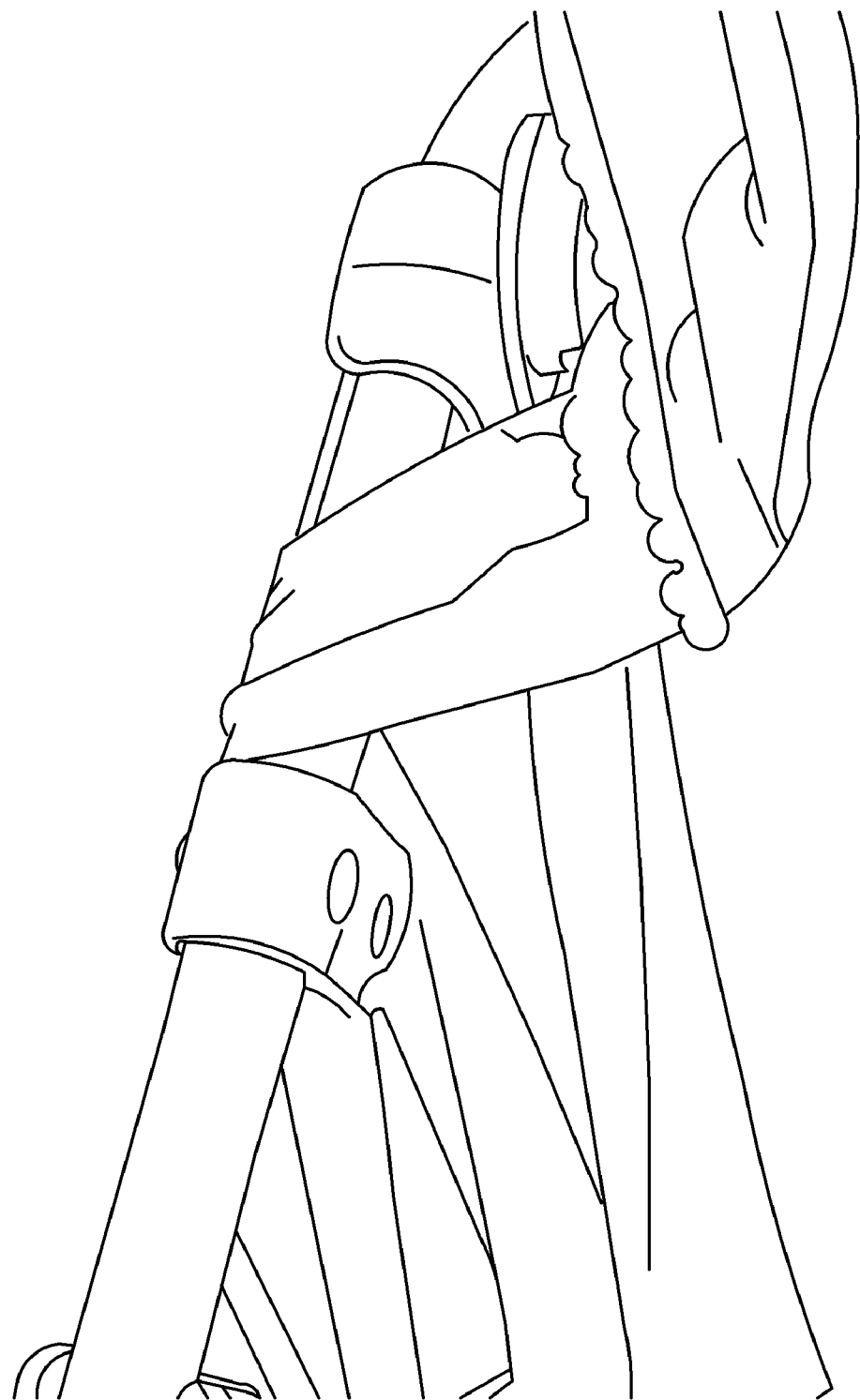
FIG. 2 illustrates the shade secured around the stroller frame.

FIG. 2 illustrates the shade secured around the stroller frame. Once secured on the frame, the shade may be tied with a bow or other securing arrangement.

Figure 3:
FIG. 3 illustrates a shade fully installed on a child's stroller.

FIG. 3 illustrates a shade fully installed on a child's stroller.

Figure 4:
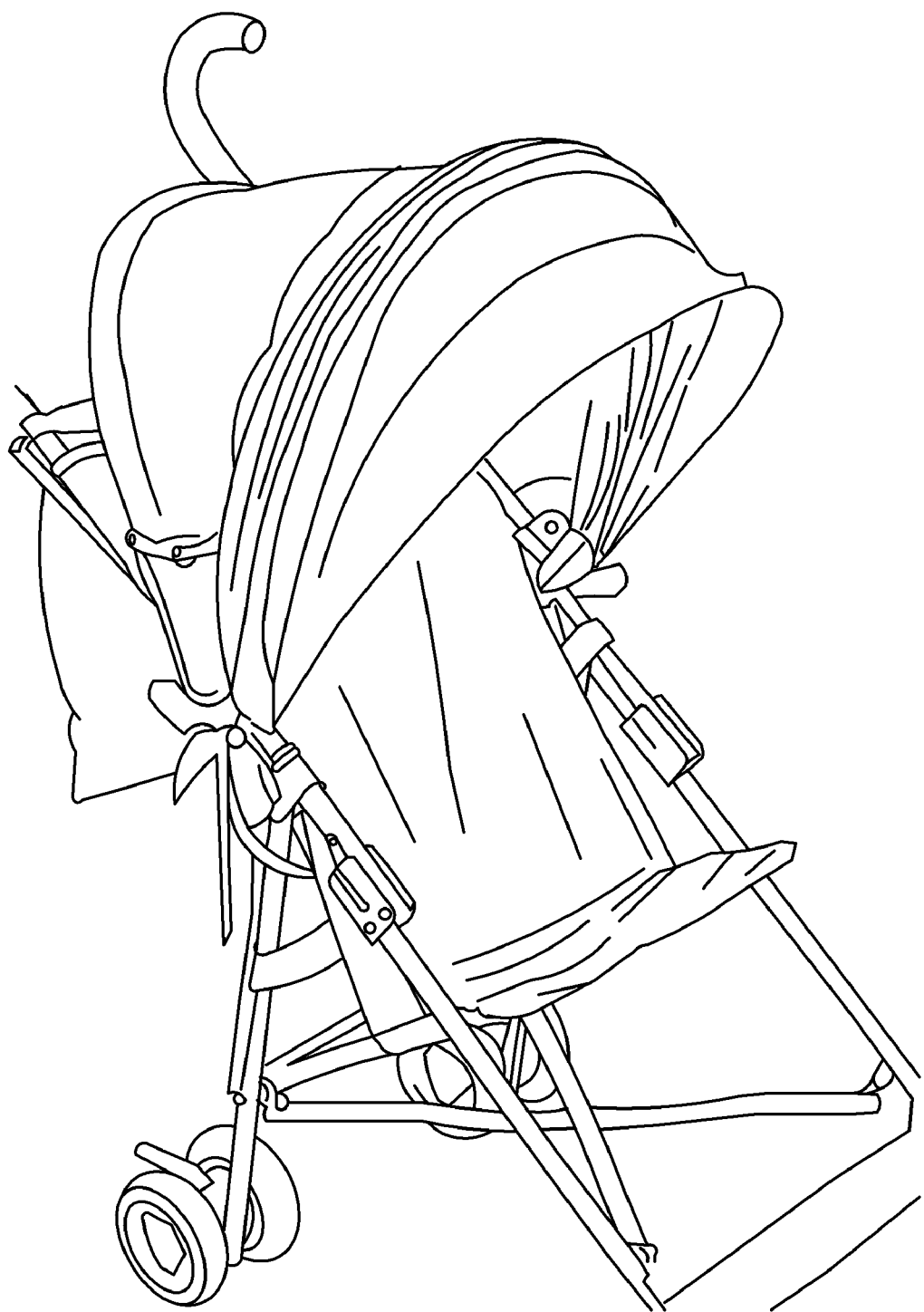
FIG. 4 illustrates a first adjustment of the shade.

FIG. 4 illustrates a first adjustment of the shade. The first setting provides a moderate amount of shading, for example if the sunlight is coming from substantially directly overhead. However, but changing the setting the shade may be used to shade a child's face and eyes from sunlight when the sunlight is incident from more of a horizontal angle. Magnets (e.g. rare earth magnets) within the shade fabric layers may be employed to secure in the various setting positions.

Figure 5:
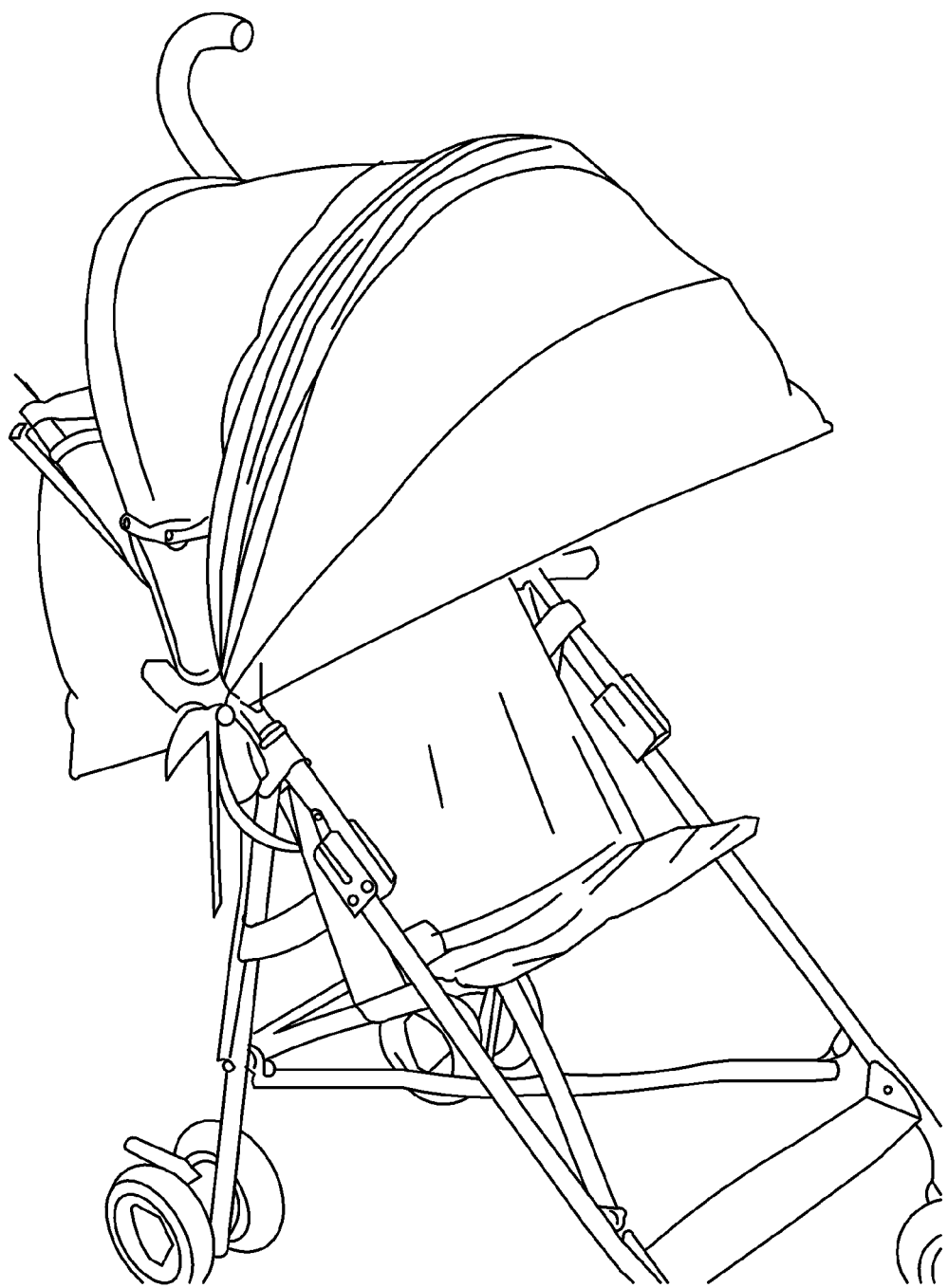
FIG. 5 illustrates the shade in a setting providing more sunlight protection to a greater extent of the child's body.

FIG. 5 illustrates the shade in a setting providing more sunlight protection to a greater extent of the child's body. The setting may be achieved from the setting of FIG. 4 by pulling on the front of the shade thus releasing the magnets.

Figure 6:
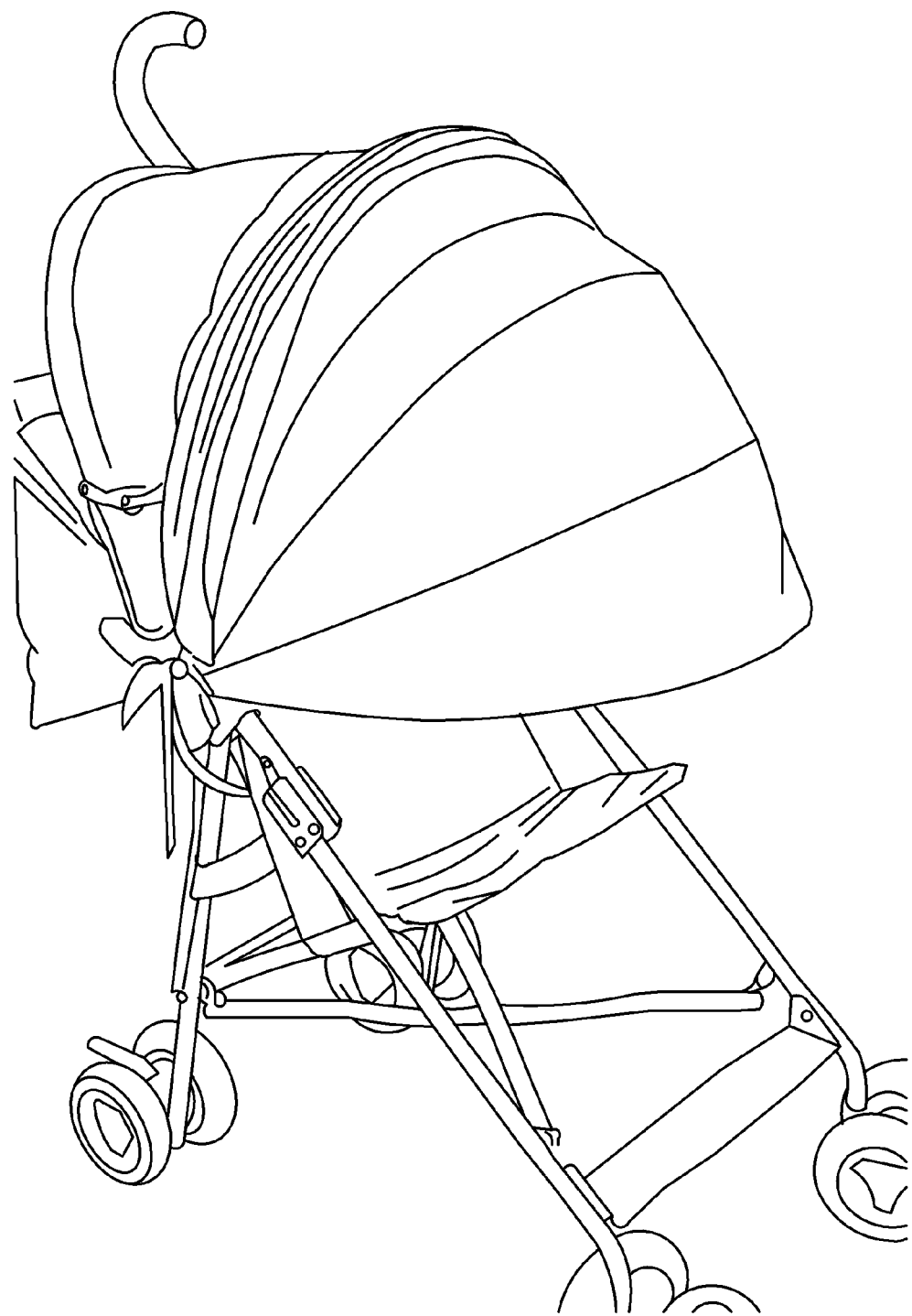
FIG. 6 illustrates a third setting of the shade which may be obtained by pulling on the front of the shade when it is within the position illustrated in FIG. 5.

FIG. 6 illustrates a third setting of the shade which may be obtained by pulling on the front of the shade when it is within the position illustrated in FIG. 5. This position provides an even higher level of sunlight protection for a child in the stroller.

Figure 7:
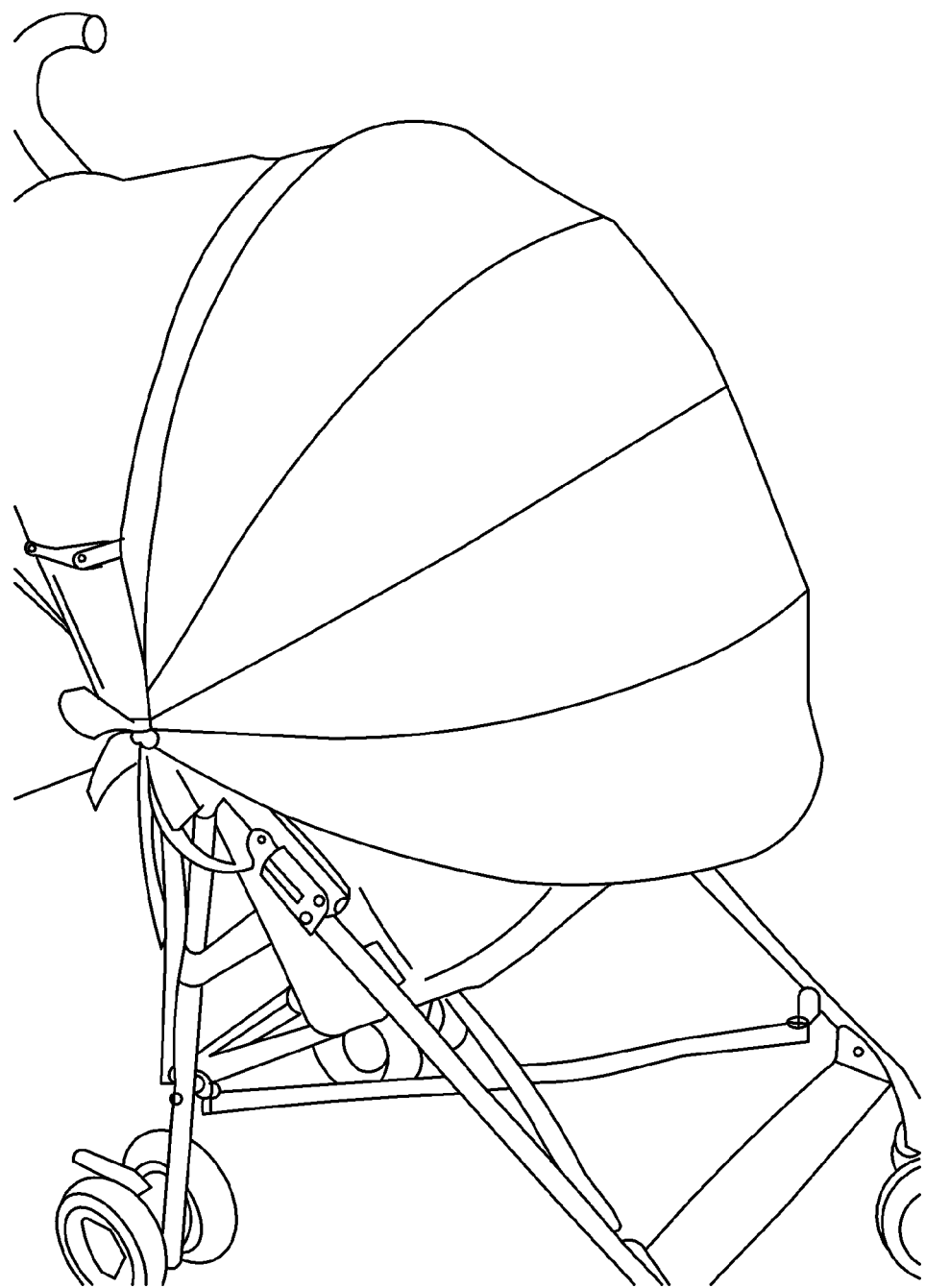
FIG. 7 illustrates a fourth setting, in which the shade covers substantially all of a child's upper body when the child is positioned in the stroller.

FIG. 7 illustrates a fourth setting, in which the shade covers substantially all of a child's upper body when the child is positioned in the stroller.

Figure 8:
FIG. 8 illustrates the shade in a fully retracted position, in which the stroller canopy is also retracted.

FIG. 8 illustrates the shade in a fully retracted position, in which the stroller canopy is also retracted. This position may be employed, for example when storing the child's stroller with the shade attached.

Figure 9:
FIG. 9 illustrates the stroller with the shade attached.

FIG. 9 illustrates the stroller with the shade attached. The stroller has been collapsed for storage or transportation.

Figure 10:
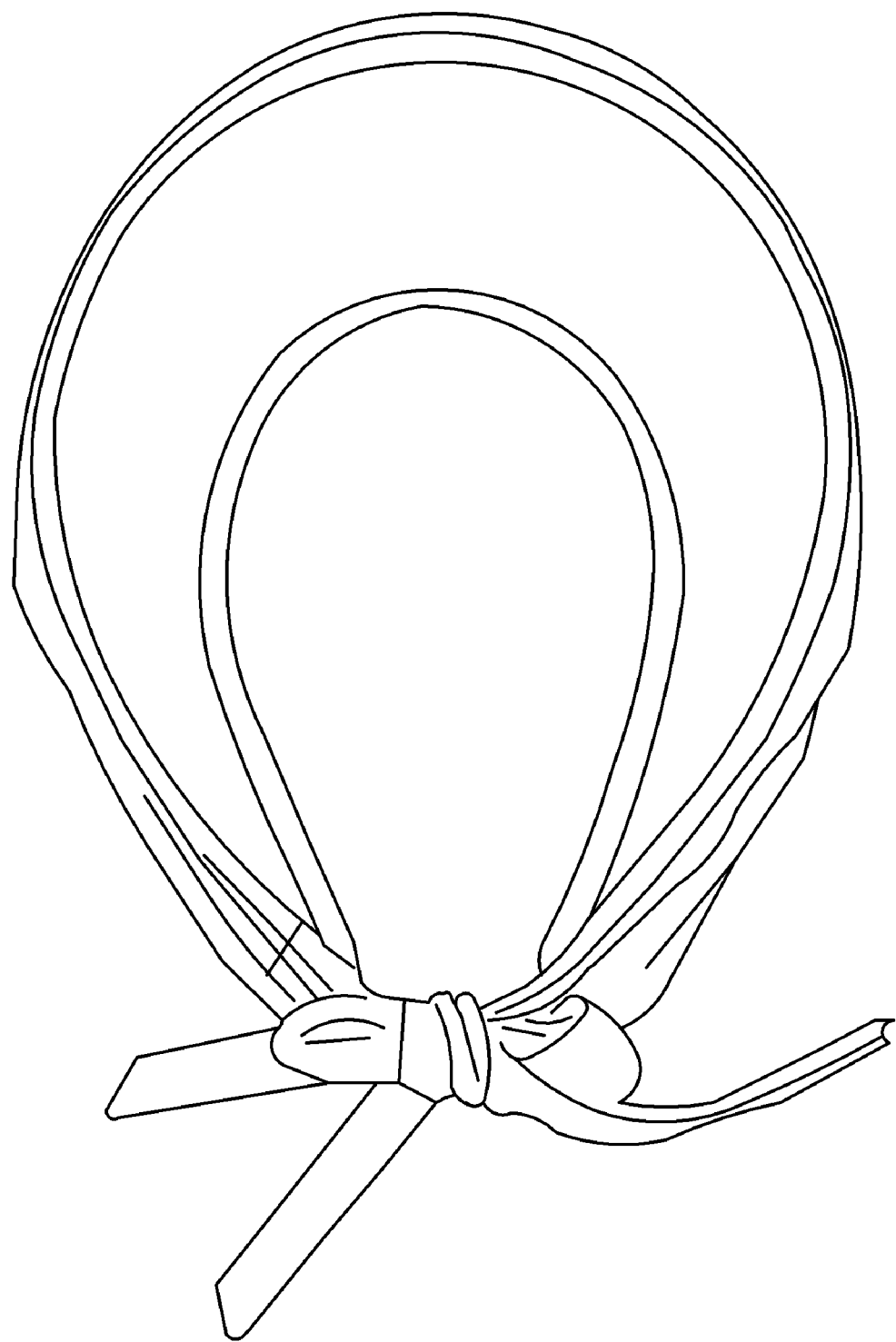
FIG. 10 illustrates the shade detached from the stroller but tied at the bottom.

FIG. 10 illustrates the shade detached from the stroller but tied at the bottom. When not mounted on a stroller, the shade may be stored in this configuration.

Figure 11:
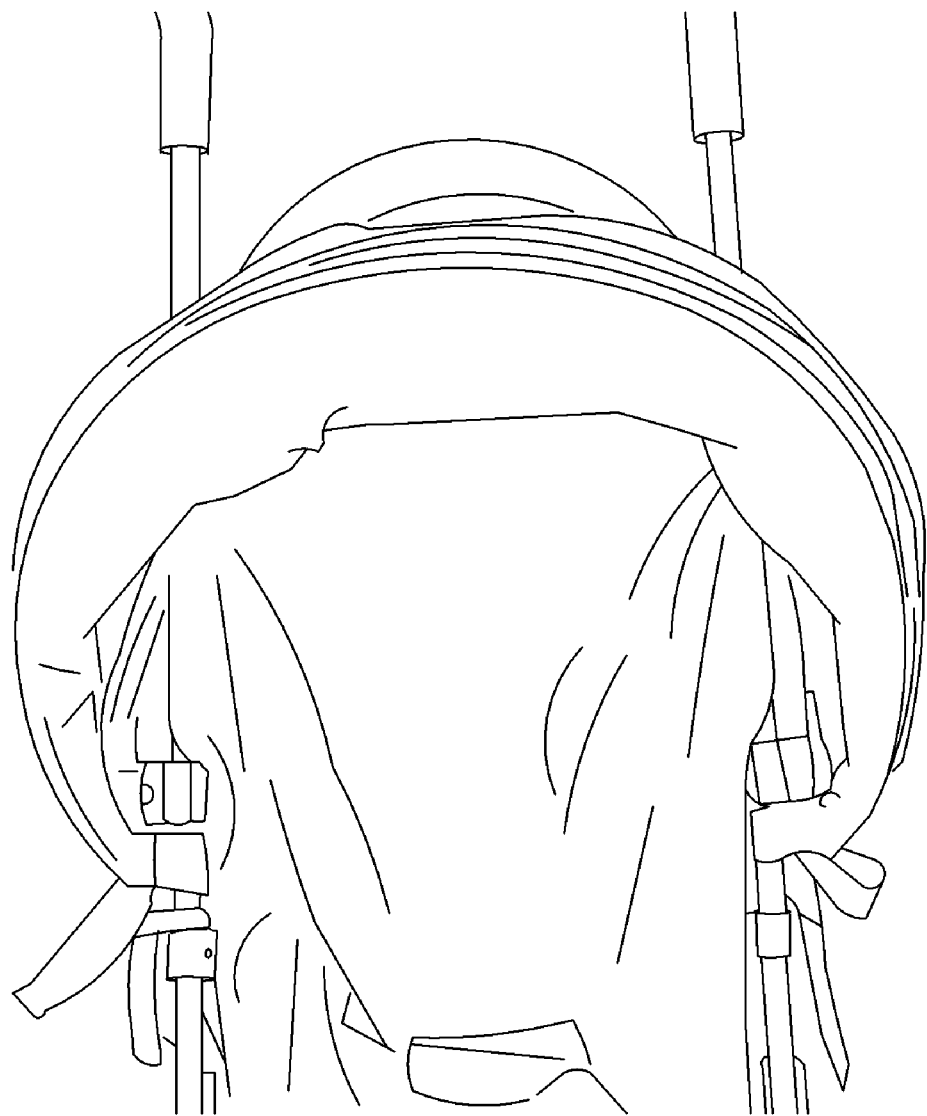
FIG. 11 illustrates the shade tied on both sides of a stroller frame.

FIG. 11 illustrates the shade tied on both sides of a stroller frame. The design of the shade enables it to fit many types and sizes of strollers and to be employed in a reversible fashion. The shade may be symmetrical with respect to a vertical axis (an axis running front to back of a stroller or carseat, once the shade is installed), thus being capable of being mounted on the stroller in a reverse configuration.

Figure 12:
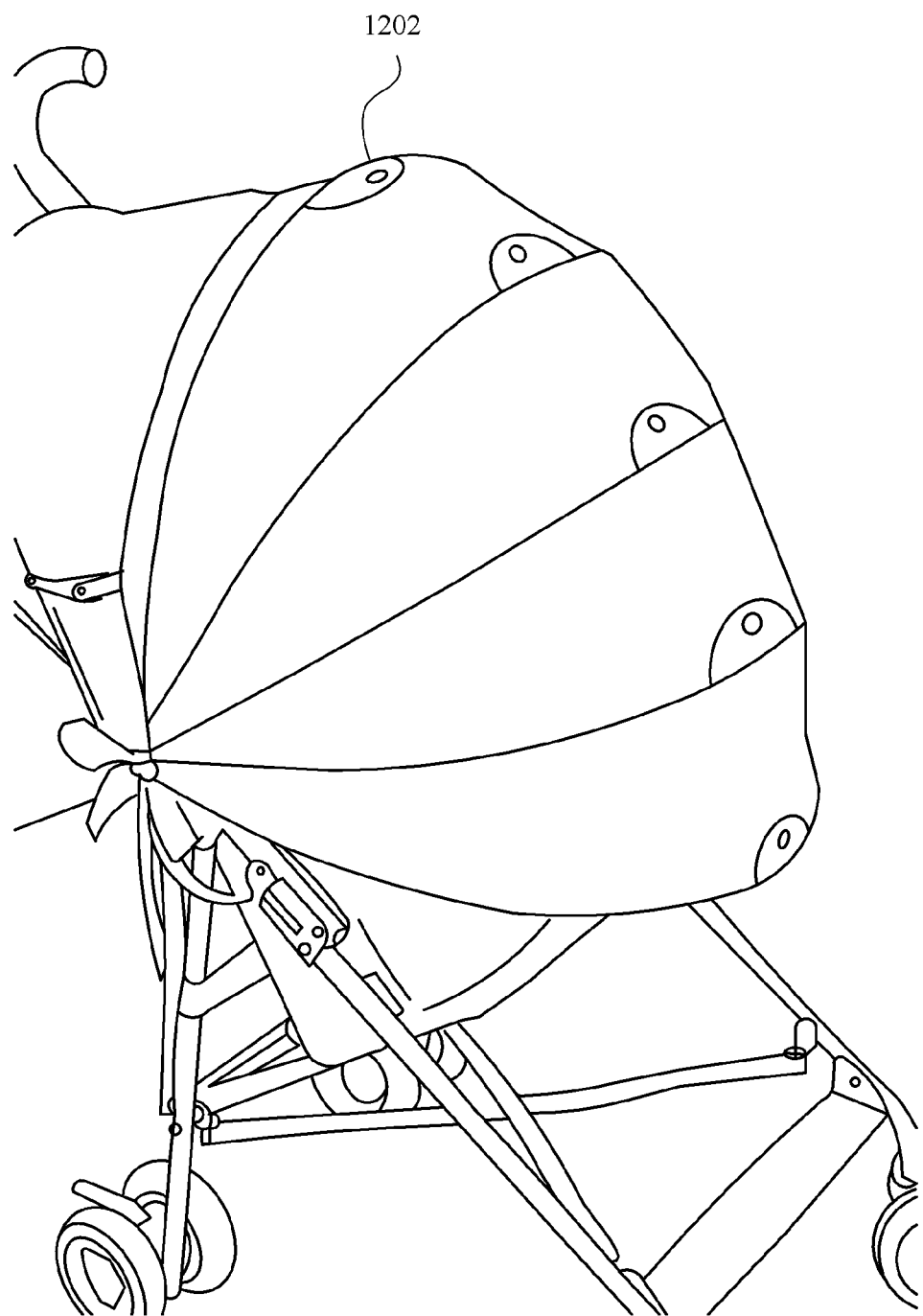
FIGS. 12 and 13 illustrate an arrangement of magnets to retain an extendable shade in different configurations.
Figure 13:
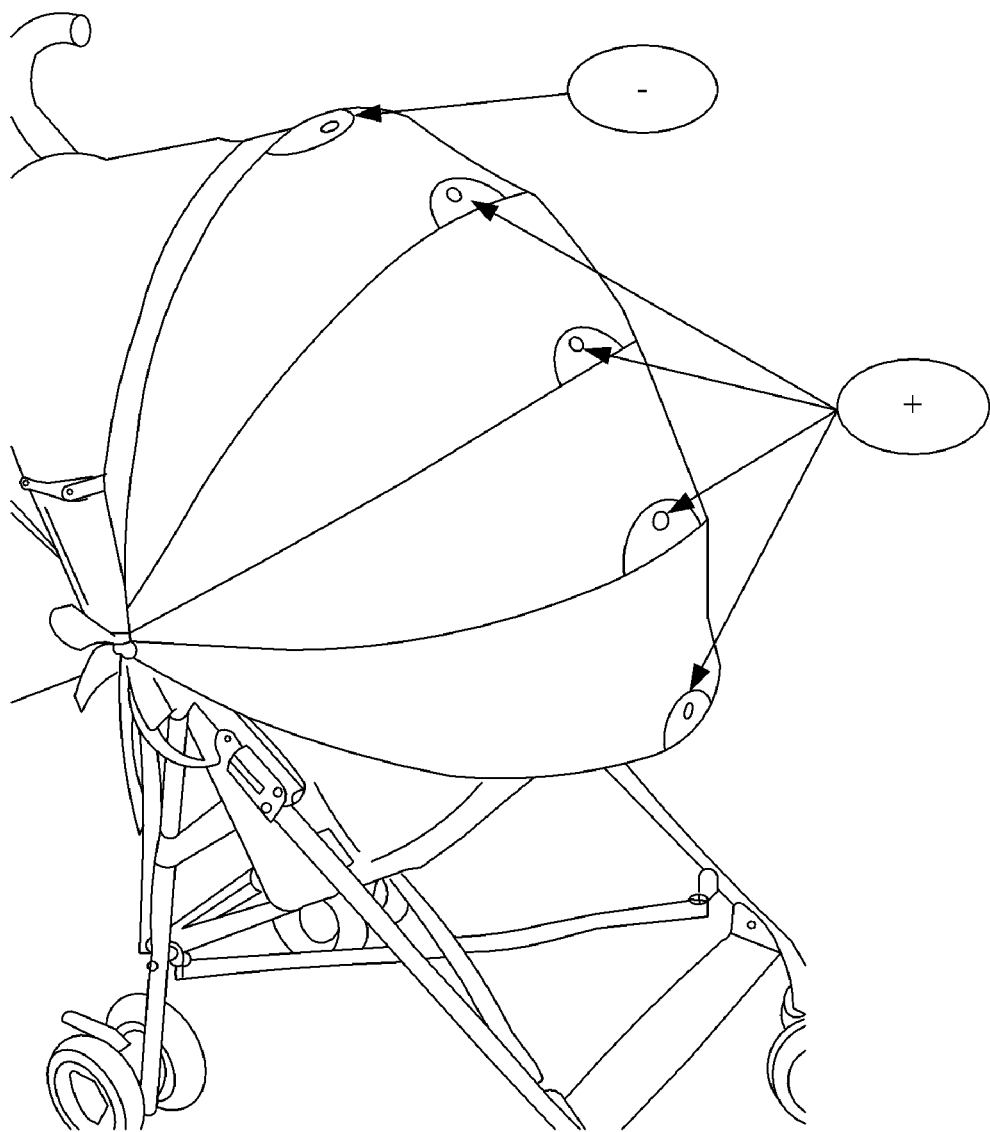

FIGS. 12 and 13 illustrate an arrangement of magnets to retain an extendable shade in different configurations. Magnets are arranged along an axis of extension. Although illustrated along a center axis of the shade, the magnets may be arranged along other axes in other embodiments (for example, in two vertically parallel columns each offset from a centerline of the mounted shade). For additional locking support, more than one magnet may be situated at each stop (horizontal location in the drawings), or at particular but not all stops (e.g., at every other stop). Note that a first magnet 1202 has an opposite orientation in terms of polarity than the other magnets. The magnets may relatively flat (the depth is ½ or less of the lesser of the width or height (or diameter for rounded magnets). In some cases the depth of the magnets may be ⅕ or less of the lesser of the width/height (or diameter). Flatness of the magnets is not required but may be preferred in some situations. The magnets may be sewn into pockets formed from the fabric of the shade.

Figure 14:
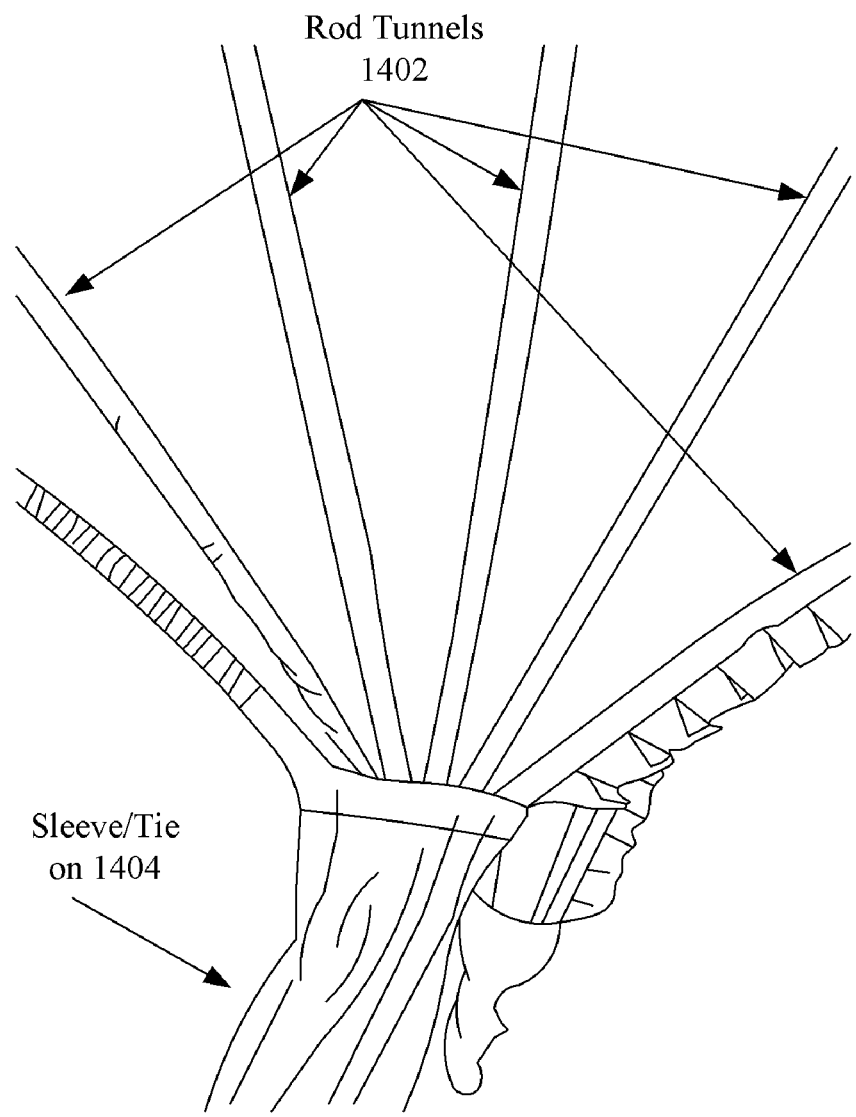
FIG. 14 illustrates converging rod tunnels for an extendable shade.

FIG. 14 illustrates diverging rod tunnels for an extendable shade. Rod tunnels 1402 diverge from a sleeve portion 1404 into the fabric of the shade. The sleeve portion 1404 may comprise openings (not shown) for inserting rods of plastic or other bendable material into the fabric. The rod tunnels 1402 may be formed from sewn fabric. Rods inserted into the rod tunnels 1402 provide the shade with structure without imparting excessive rigidity that might hinder configurability. The rod tunnels 1402 diverge from a sleeve (which also acts as a tie-on for the shade to a stroller) around an outer circumference of the shade, and converge again at a second sleeve (not shown) on an opposite side of the shade. The second sleeve also acts as a tie-on for the shade to a stroller. The rod tunnels 1402 create extension sections for the shade that when coupled with magnetic stops correspond to stable configuration positions between fully opened and fully closed.

Figure 15:
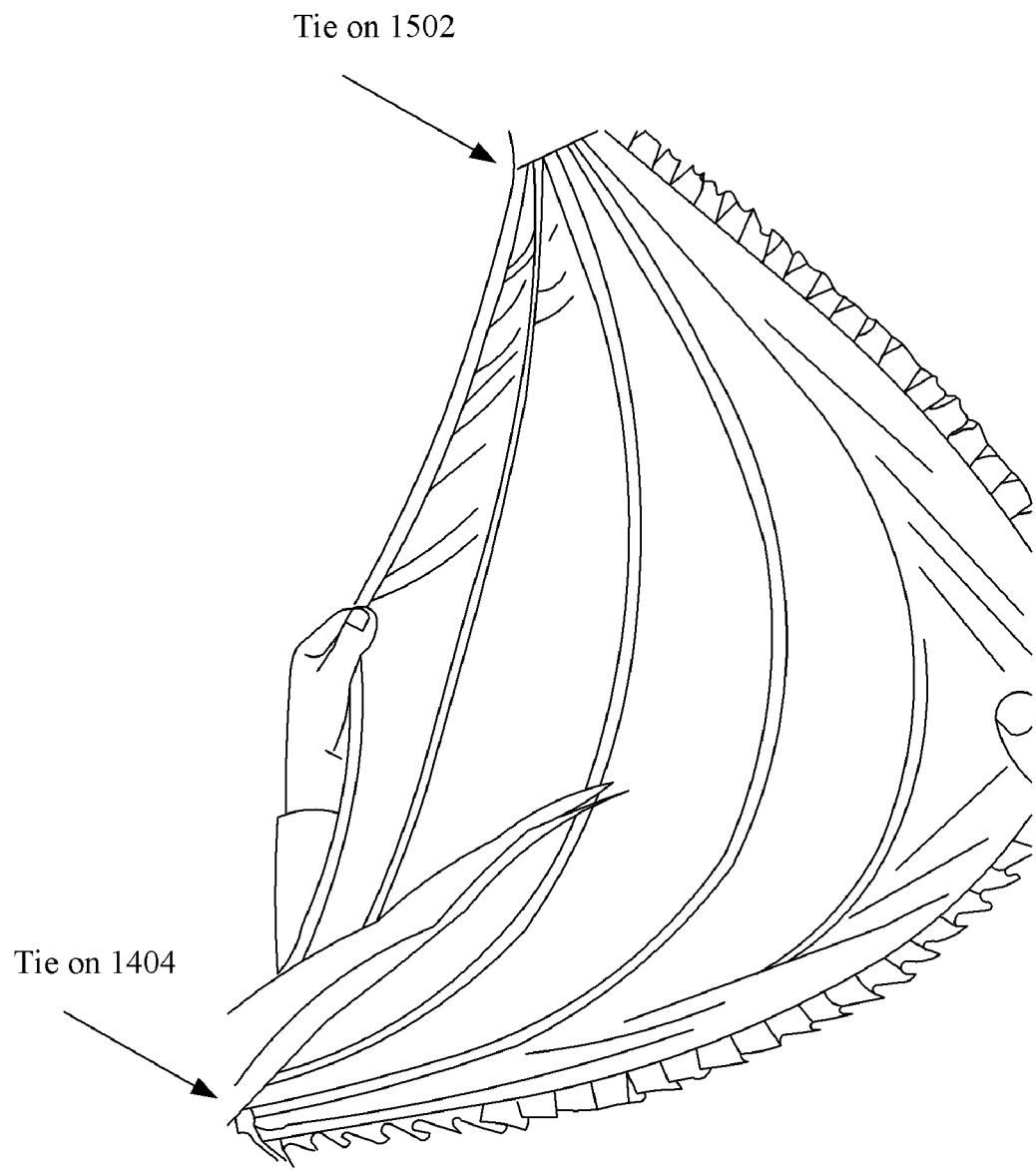
FIG. 15 illustrates a portion of an extendable shade with rods inserted into rod tunnels.
Figure 16:
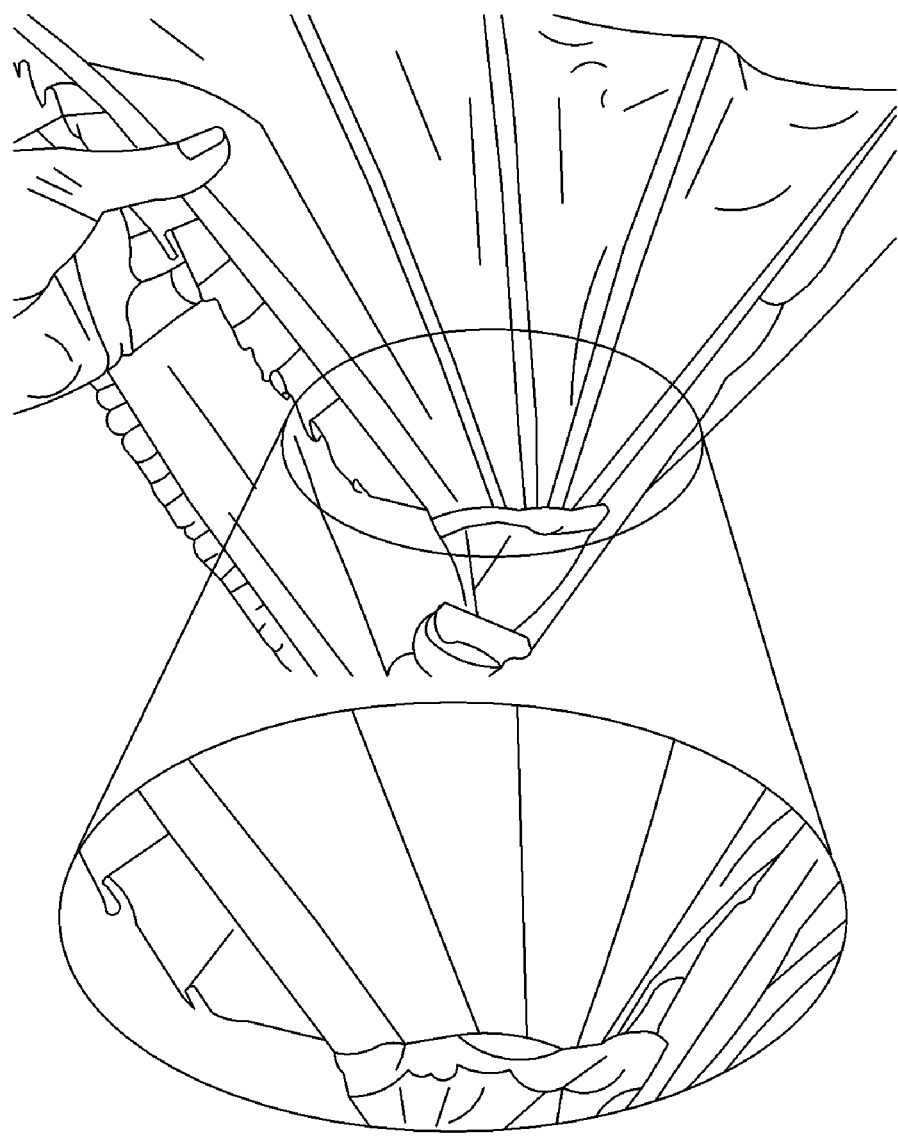
FIG. 16 illustrates an exploded view of an area of an extendable shade that may accept rods into the fabric.
Figure 17:
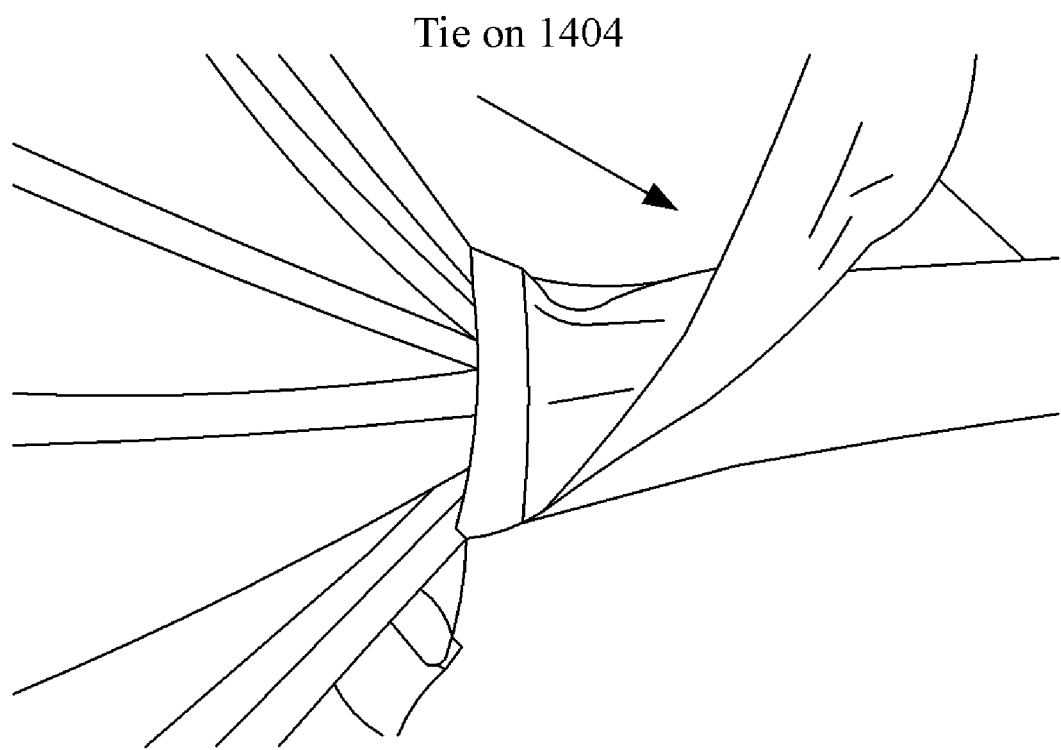
FIG. 17 illustrates rod tunnels converging at a tie-on area of an extendable shade.
Figure 19:
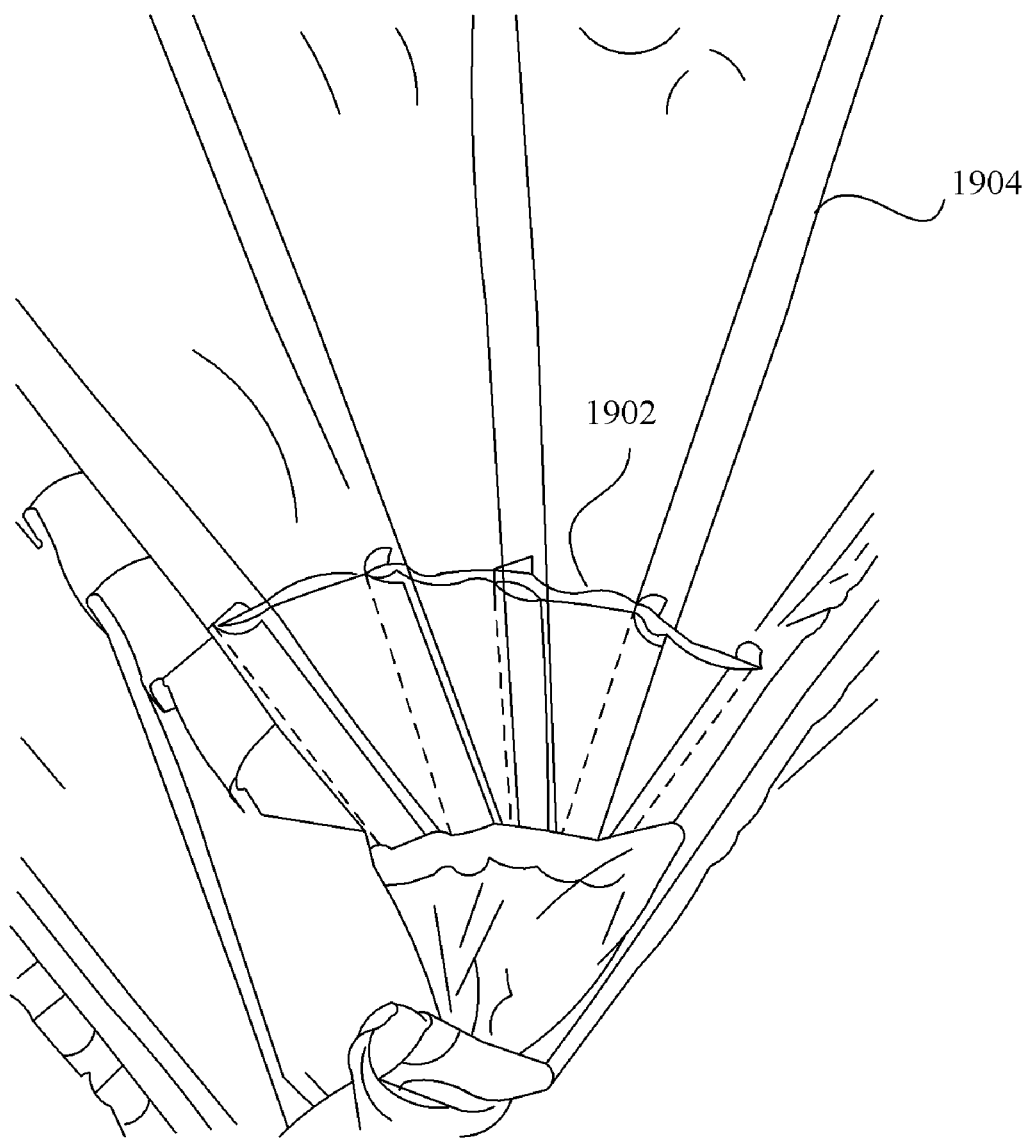
FIG. 19 illustrates a rip stop reinforcement for rod ends in an extendable shade.
Figure 20:
FIGS. 20-24 illustrate an extendable shade adapted for use with a child car seat.
Figure 21:
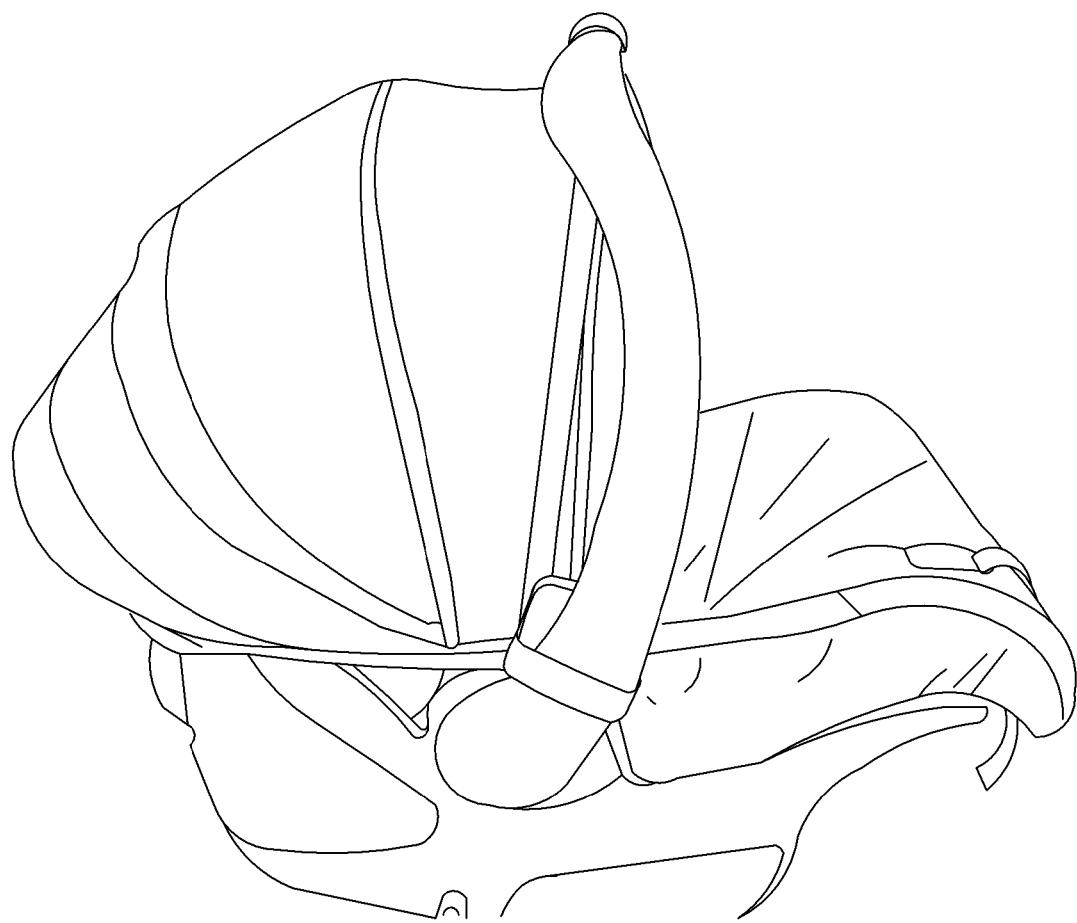
Figure 22:
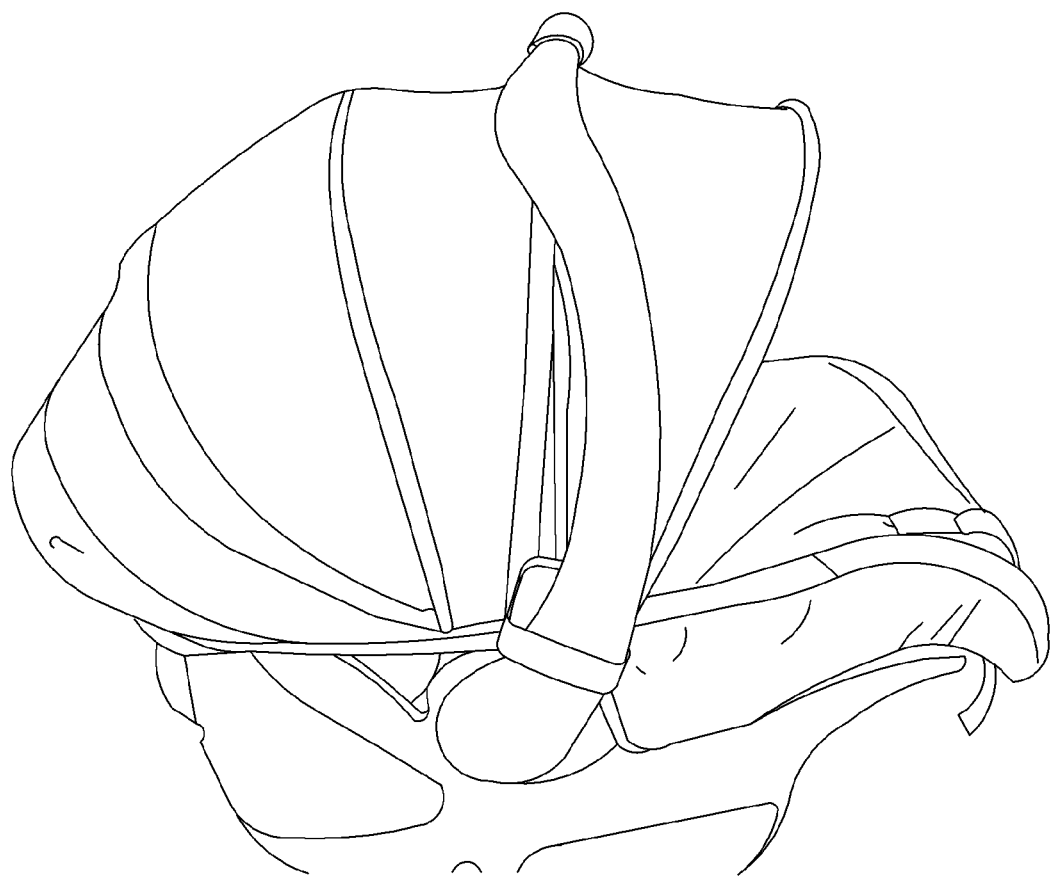
Figure 23:
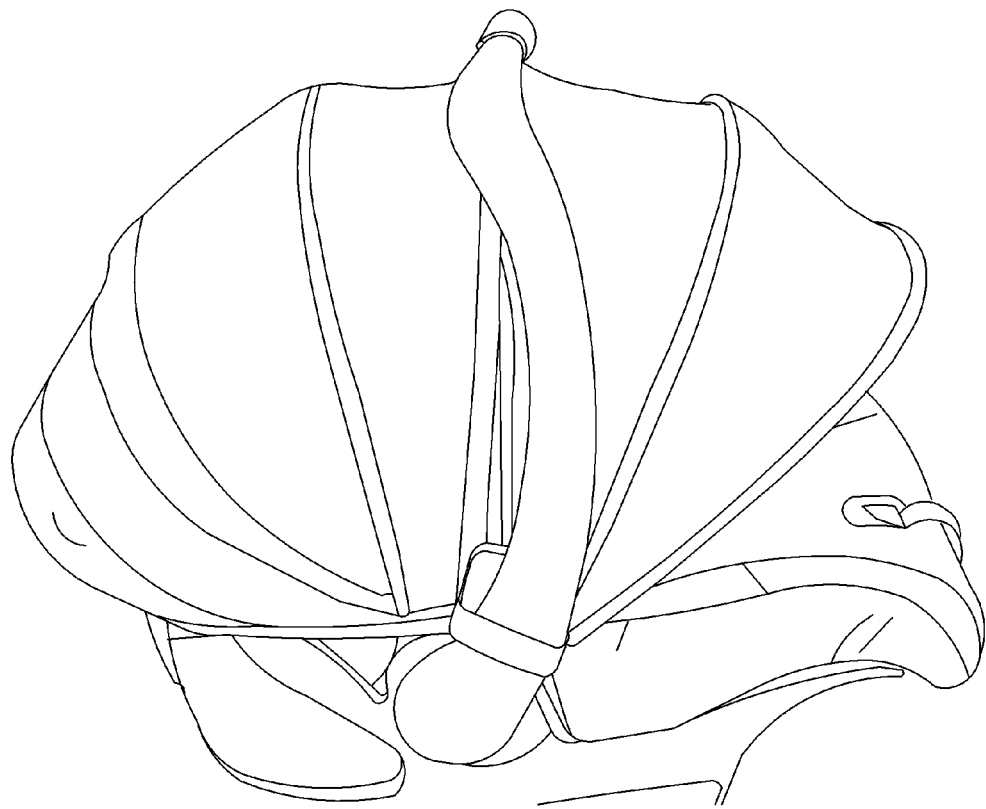
Figure 24:
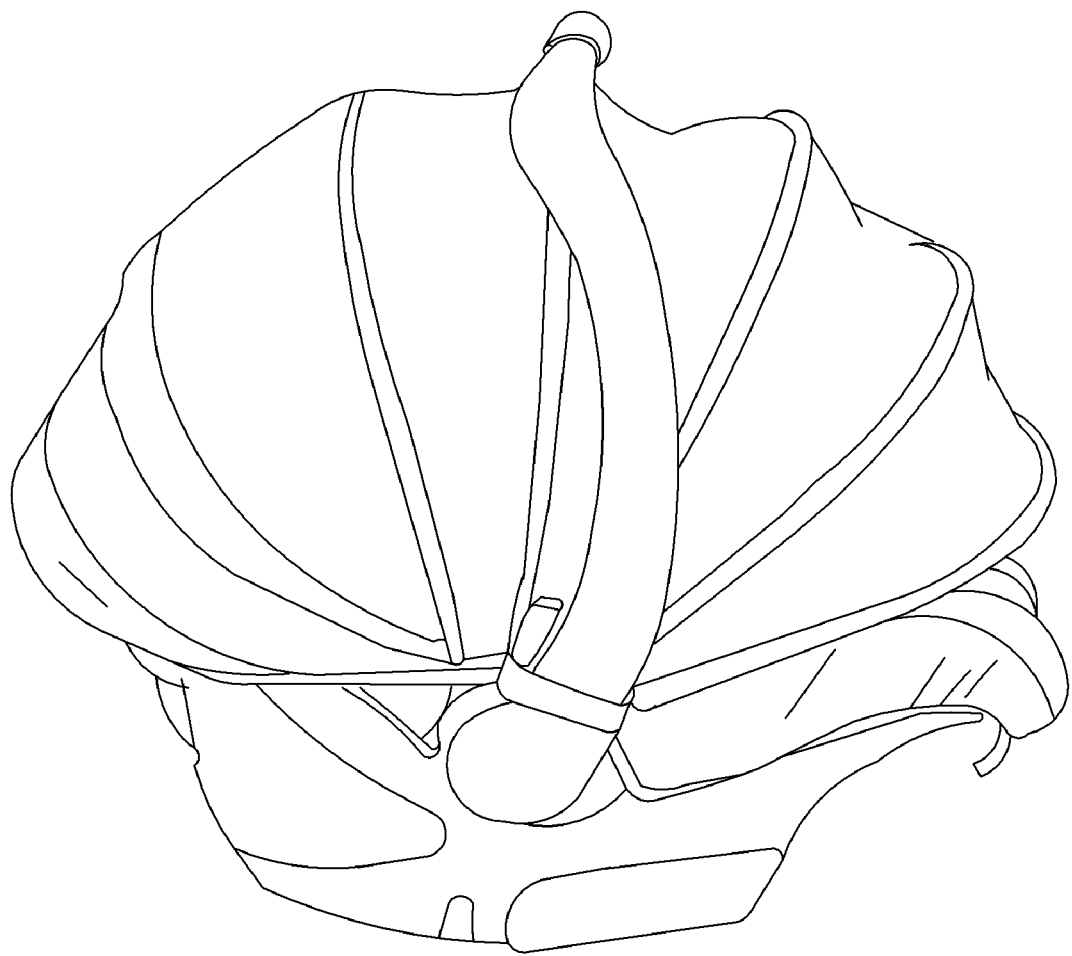

FIG. 15 illustrates a portion of an extendable shade between tie-offs. Rod tunnels 1402 can be seen diverging from a first tie on 1502 through the fabric, and reconverging at a second tie on 1404. FIG. 16 illustrates an exploded view of an area of an extendable shade where rod tunnels diverge into the fabric. FIG. 17 illustrates in more detail rod tunnels converging at a tie-on area of an extendable shade. FIG. 19 illustrates a rip stop reinforcement for rod ends in an extendable shade. The rip stop 1902 functions to prevent rips at the openings of the rod tunnels.

Figure 18:
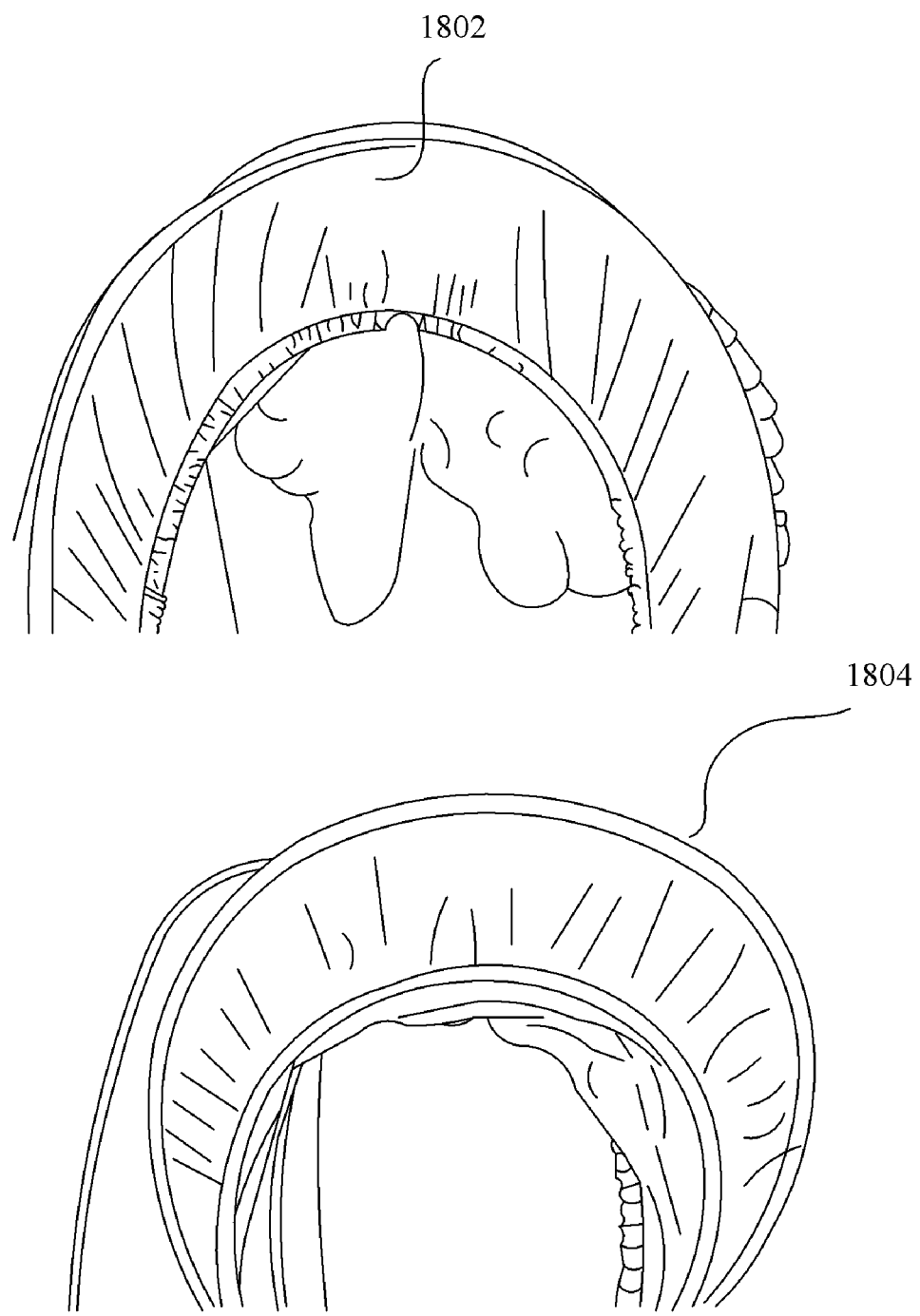
FIG. 18 illustrates views of a rear elastic panel of an extendable shade from two sides.

FIG. 18 illustrates views of a elastic panel of an extendable shade from two sides. The elastic panel 1802 may function to secure the shade to an existing stroller canopy without damaging the canopy. A rod 1804 may provide firmness to the shape of the elastic panel.

FIGS. 20-24 illustrate an extendable shade adapted for use with a child car seat. The car seat shade may be designed substantially similar to the stroller shade concepts elaborated on herein, with adaptations for use with a car seat that will be readily apparent to those skilled in the art. For example, the tie ons (if used) may wrap around under the seat and/or tie to features of the seat (such as the handle), or to one another. Or, a belt or strap may be used in place of the tie ons. In other aspects the car seat embodiment may be similar to stroller models, such as using magnet arrangements to secure various configuration positions of the shade, using rods and rod tunnels, elastics, and similar materials for fabric, rods, and magnets.

FIGS. 25A-25C illustrate magnet configurations 2506 for an extendable shade. The sections A-C each comprise one magnet; there are two magnets on section D. One of the magnets on section D is oriented with opposite polarity relative to the other magnets. Each section is folded to create folds 2504. FIG. 25A illustrates how the five magnets of this embodiment align as the sections are folded together. Also illustrated is the elastic 2508 that secures the shade to an existing stroller canopy. FIG. 25B illustrates an eight magnet embodiment. The shade comprises four sections A-D, each with two magnets. Each pair of magnets on a section is arranged to have opposite polarity with respect to one another. FIG. 25C illustrates an embodiment of fabric sections, including five magnets, that may be sewed together to create an extendable shade.

Figure 26:
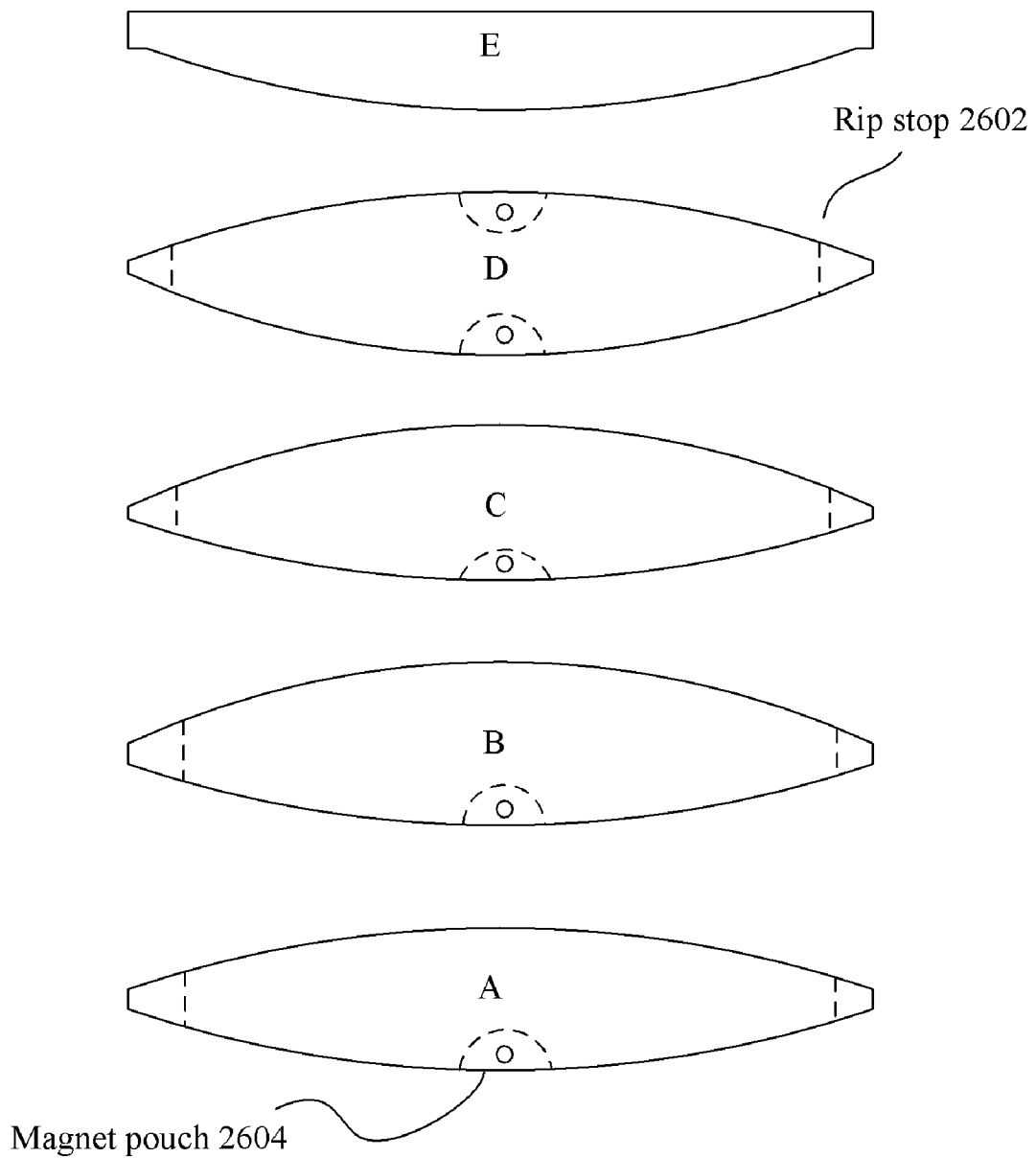
FIG. 26 illustrates an embodiment of fabric panels that may be joined to form an embodiment of an extendable shade.

FIG. 26 illustrates an embodiment of fabric panels that may be joined to form an embodiment of an extendable shade for strollers. Each of four sections A-D are shaped like a tapered ellipse. Each section includes rip stop 2602 in the tapered ends, and magnet pouches 2604 into which magnets may be inserted and retained. Each magnet pocket may comprise a ripstop to help prevent the magnet from wearing through the fabric. A fifth section E may serve to retain an elastic band that secures the shade to an existing stroller canopy.

To make the shade reversible, the product is symmetrical vertically (front to back). Horizontally it is symmetrical up until the elastic panel E.

Figure 27:
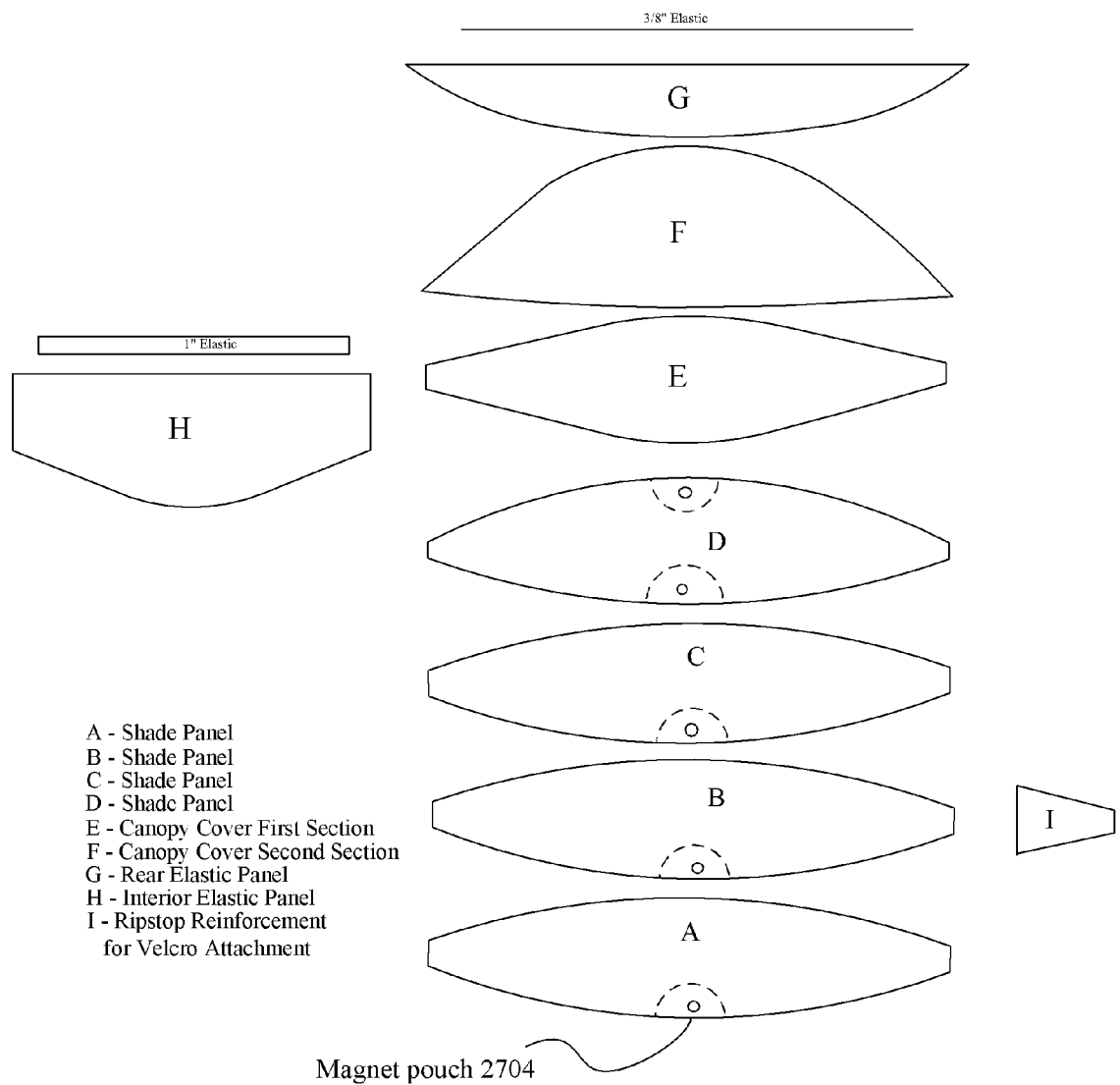
FIG. 27 illustrates an embodiment of fabric panels that may be joined to form an embodiment of an extendable shade for a car seat.

FIG. 27 illustrates an embodiment of fabric panels that may be joined to form an embodiment of an extendable shade for a car seat. The embodiment comprises two elastic panels G,H. One elastic panel H is sewn into the underside of the product to secure the shade to the carseat's existing canopy so it doesn't slip off the canopy when adjusting the shade. There is also an elastic panel H around the base of the existing carseat canopy. This panel secures the back piece of fabric over the existing canopy. Other embodiments may employ a "shock cord" or elastic cord to customize the tightness to the different sizes of carseats.

The car seat shade embodiment includes magnet pouches 2704. It is symmetrical vertically, but not horizontally due to the different shape of the rear elastic panel.

Figure 28:
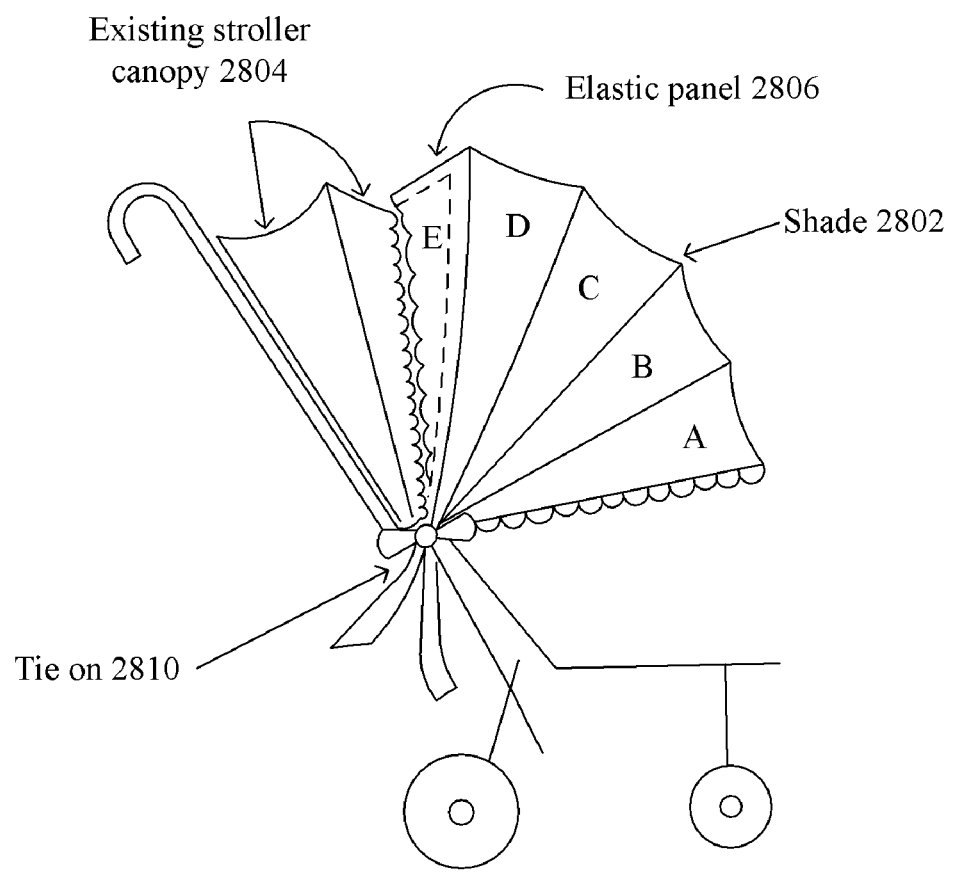
FIG. 28 illustrates how an extendable shade embodiment may be secured to a stroller.

FIG. 28 illustrates how an extendable shade embodiment may be secured to a stroller. The shade 2802 ties onto the frame of the stroller via tie ons 2810. The elastic panel 2806 secures the shade 2802 to the existing stroller canopy 2804.

Figure 29:
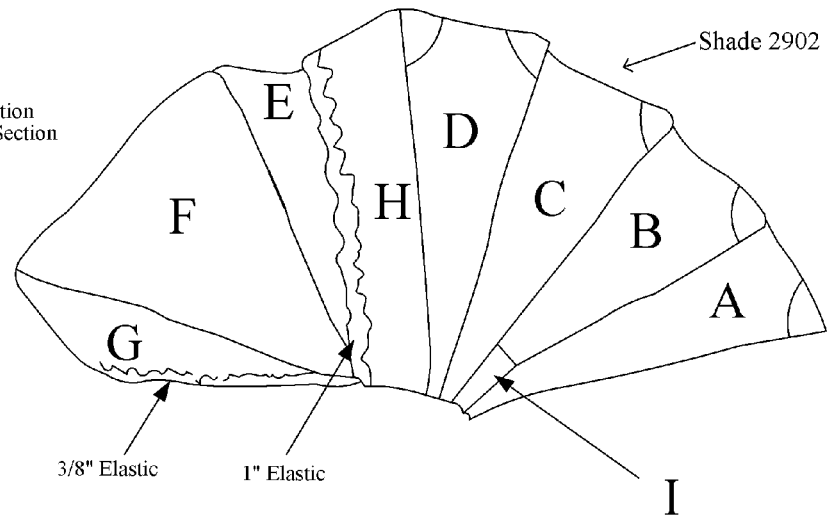
FIG. 29 illustrates how an extendable shade embodiment may be secured to a car seat.
Figure 29:
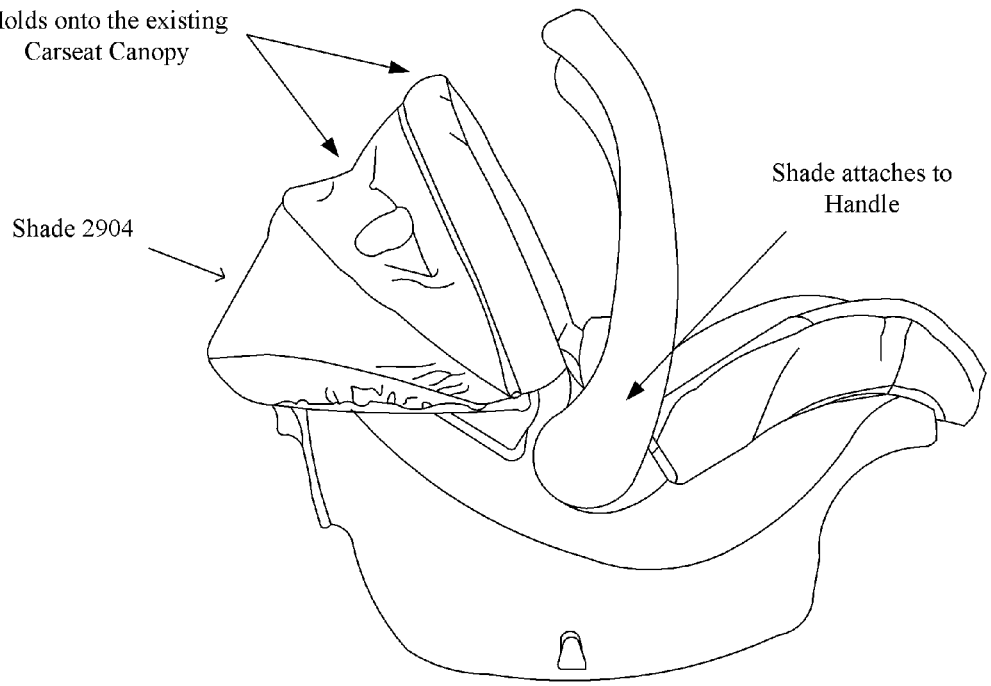

FIG. 29 illustrates how an extendable shade embodiment may be secured to a car seat. The shade 2902 attaches to the handles of the car seat, and elastic panels G,H secure the shade 2902 to the existing car seat canopy 2904.

What is claimed is:

1. A stroller shade, comprising:
   a fabric having a middle section tapered on two sides;
   rod tunnels running from a first taper across the middle section to a second taper;
   an elastic section formed to wrap around and attach to a front opening of an existing canopy on a stroller;
   the shade being symmetrical relative to a front to back axis; and
   fasteners positioned at a series of overlapping stop positions parallel to the front to back axis.

2. The shade of claim 1, further comprising:
   the shade formed from a plurality of fabric sections each shaped like a tapered ellipse.

3. The shade of claim 1, further comprising:
   the fasteners are flat magnets sewn into pockets of the fabric.

4. The shade of claim 1, further comprising:
   the first and second tapers extending into loose fabric at least five inches long.

5. A car seat shade, comprising:
   a fabric having a middle section tapered on two sides;
   rod tunnels running from a first taper across the middle section to a second taper;
   a first elastic section formed to wrap around and attach to a front opening of an existing canopy on a car seat;
   a second elastic section formed to wrap around and attach to a base of the existing canopy of the car seat;
   the shade being symmetrical relative to a front to back axis; and
   fasteners positioned at a series of overlapping stop positions parallel to the front to back axis.

6. The shade of claim 5, further comprising:
   the shade formed from a plurality of fabric sections each shaped like a tapered ellipse.

7. The shade of claim 5, further comprising:
   the fasteners are flat magnets sewn into pockets of the fabric.

8. The shade of claim 5, further comprising:
   the first and second tapers extending into loose fabric at least five inches long.

* * * * *